UNITED STATES PATENT OFFICE.

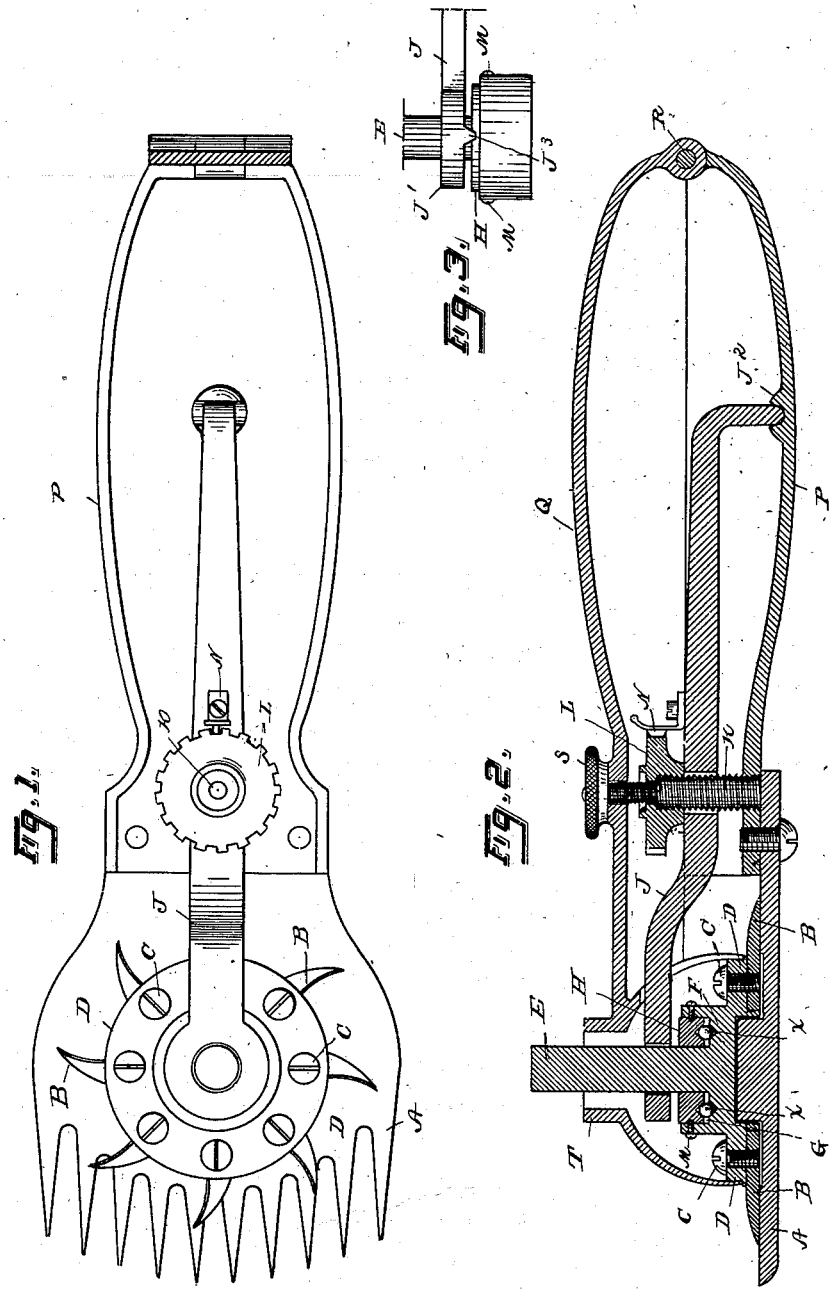

JOHN HENRY SILLEY AND WALTER WILLIAM BACON, OF SYDNEY, NEW SOUTH WALES.

ROTARY SHEARING-MACHINE.

SPECIFICATION forming part of Letters Patent No. 650,054, dated May 22, 1900.

Application filed June 3, 1899. Serial No. 719,323. (No model.)

*To all whom it may concern:*

Be it known that we, JOHN HENRY SILLEY and WALTER WILLIAM BACON, engineers, of Sydney, in the Colony of New South Wales, have invented certain new and useful Improvements in Rotary Shearing-Machines; and we do hereby declare the following to be a full, clear, and exact description of said invention, such as will enable others skilled in the art to which it most nearly appertains to make, use, and practice the same.

This invention relates to improvements in shearing-machines, and more particularly to sheep-shearing machines.

The objects of this invention are, first, to provide a machine in which the vibration of the working parts is reduced to a minimum; second, to substitute a rotary movement of the cutting-blades for the reciprocating movement generally adapted in shearing-machines; third, to provide a machine in which the cutting-blades are easily interchangeable, and, fourth, to provide a machine which can be manufactured cheaply and which consists of few working parts.

To make our invention clear, we shall refer at once to the accompanying drawings.

Figure 1 is a plan of our machine with top cover removed. Fig. 2 is section through the machine complete; Fig. 3, an elevation showing end of tension-lever and portion of revolving disk.

A is the comb.

B B are adjustable cutting-blades which are held in position by the screws C C, and said blades may be made in any desirable shape.

D is the disk or cutter-head to which the cutting-blades B B are fixed. This disk has a central cut-out portion on its inner side— i. e., the side toward the comb—to receive an inwardly-extending portion of said comb, whereby the disk is journaled upon the comb.

E is a spindle by means of which the disk D, carrying the cutting-blades B B, is revolved. The spindle E may be an integral part of disk D or may be attached thereto in any suitable manner.

F is a shoulder or boss on the top side of disk D and forming part thereof, in which is formed an annular recess G. In this annular recess is formed a raceway for a number of steel balls X X, and a ring or washer H is fitted in said recess on top of the balls, this construction being provided for the purpose of reducing the friction when the desired tension is applied to keep the cutting-blades B B in close contact with the comb A.

J is a spring-lever, one end of which fits over the spindle E and rests on ring or washer H, the other end being retained in a socket $J^2$.

K is a threaded fixed pillar which passes through an aperture in center of the spring-lever J.

L is a tension-nut on fixed pillar K, provided for the purpose of regulating the tension, as when the nut L is screwed down the end J' of lever J is pressed down on washer H, thus keeping the cutting-blades B B in close contact with the comb A. The end J' of lever J which fits over spindle E, is provided on the under side with projections or teeth $J^3$, Fig. 3, which fit into grooves in the washer or ring H for the purpose of preventing the washer H from revolving.

M M are small set-screws provided for the purpose of holding the washer H in position when the lever J is removed, the washer having its outer face grooved to receive said set-screws.

N is a spring attachment provided to lock the tension-nut L.

P is the lower portion of the handle of the machine.

Q is the upper portion of the handle of the machine.

R is a hinge, by means of which the upper and lower portions of the handle are connected.

S is a nut holding upper portion of handle in position, said nut working upon the threaded pillar K.

T is a shield which is attached to the upper portion of the handle and fits over and protects the revolving disk D.

The method of operating our invention is as follows: The power is transmitted to the spindle E by means of a flexible shaft connected in any suitable manner to the said spindle and the disk D, carrying the cutting-blades B, revolved. The blades B B are kept in contact with the comb A by means of spring-lever J, the pressure being regulated by tension-nut L, the revolving disk D being protected from contact with the wool or other material to be shorn by means of the shield T.

Having now particularly described and ascertained the nature of our said invention and in what manner the same is to be performed, we declare that what we claim is—

1. In an improved shearing-machine, the combination of a revolving disk having cutting-blades secured thereon, and a comb, with a spring-lever engaging said disk and a tension-nut in contact with said lever; substantially as described.

2. In a shearing-machine, a comb, a coöperating cutter-carrying head, one of said coöperating members being relatively fixed while the other has movement toward and away from said relatively-fixed member, a movable part upon a portion of the machine connected to the relatively-fixed member and adapted to bear upon the said movable coöperating member to control the contact between the said coöperating members, and an antifriction-bearing between said movable part and the said movable coöperating member; substantially as described.

3. In a shearing-machine, a comb, a coöperating cutter-carrying head, one of said coöperating members being relatively fixed while the other has movement toward and away from said relatively-fixed member, a movable part upon a portion of the machine connected to the relatively-fixed member and adapted to bear upon the said movable coöperating member to control the contact between the said coöperating members, a washer upon said movable coöperating member against which washer the said movable part bears and antifriction-rollers interposed between said washer and said movable coöperating member; substantially as described.

4. In a shearing-machine, a comb, a coöperating cutter-carrying head, one of said coöperating members being relatively fixed while the other has movement toward and away from said relatively-fixed member, a movable part upon a portion of the machine connected to the relatively-fixed member and adapted to bear upon the said movable coöperating member to control the contact between the said coöperating members, a washer upon said movable coöperating member against which washer the said movable part bears, means for preventing separation of the washer and the said movable coöperating member, and antifriction-rollers interposed between said washer and said movable coöperating member; substantially as described.

5. In a shearing-machine, a comb, a coöperating cutter-carrying head, one of said coöperating members being relatively fixed while the other has movement toward and away from said relatively-fixed member, a movable part upon a portion of the machine connected to the relatively-fixed member and adapted to bear upon the said movable coöperating member to control the contact between the said coöperating members, a washer fitting in a recess in said movable coöperating member against which washer the said movable part bears, and antifriction-rollers interposed between said washer and said movable coöperating member; substantially as described.

6. In a shearing-machine, a comb, a coöperating cutter-carrying head, one of said coöperating members being relatively fixed while the other has movement toward and away from said relatively-fixed member, a movable part upon a portion of the machine connected to the relatively-fixed member and adapted to bear upon the said movable coöperating member to control the contact between the said coöperating members, a washer fitting in a recess in said movable coöperating member against which washer the said movable part bears, said washer having its outer face grooved, set pins projecting through the walls of the said recess and extending into said groove, and antifriction-rollers interposed between said washer and said movable coöperating member; substantially as described.

In testimony whereof we have hereunto set our hands this 18th day of November, 1898.

JOHN HENRY SILLEY.
WALTER WILLIAM BACON.

Witnesses:
WALTER SIGMONT,
ARCHIE GRANT.